Nov. 1, 1960  E. P. G. WRIGHT ET AL  2,958,726
TELEGRAPHY ENCODING EQUIPMENT COMPRISING
MAGNETIC STORAGE MEANS
Filed Oct. 14, 1954  6 Sheets-Sheet 1
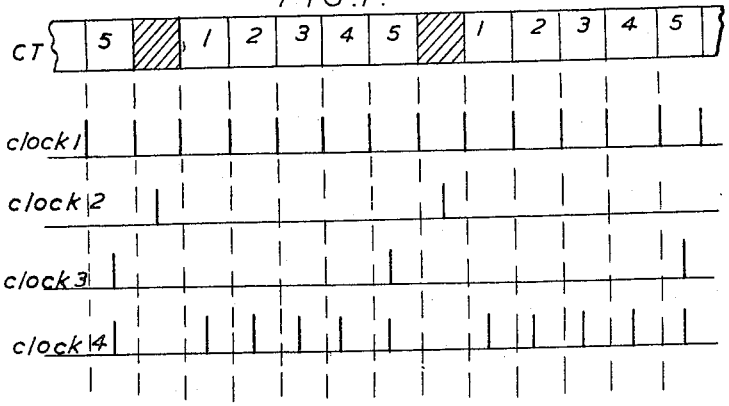
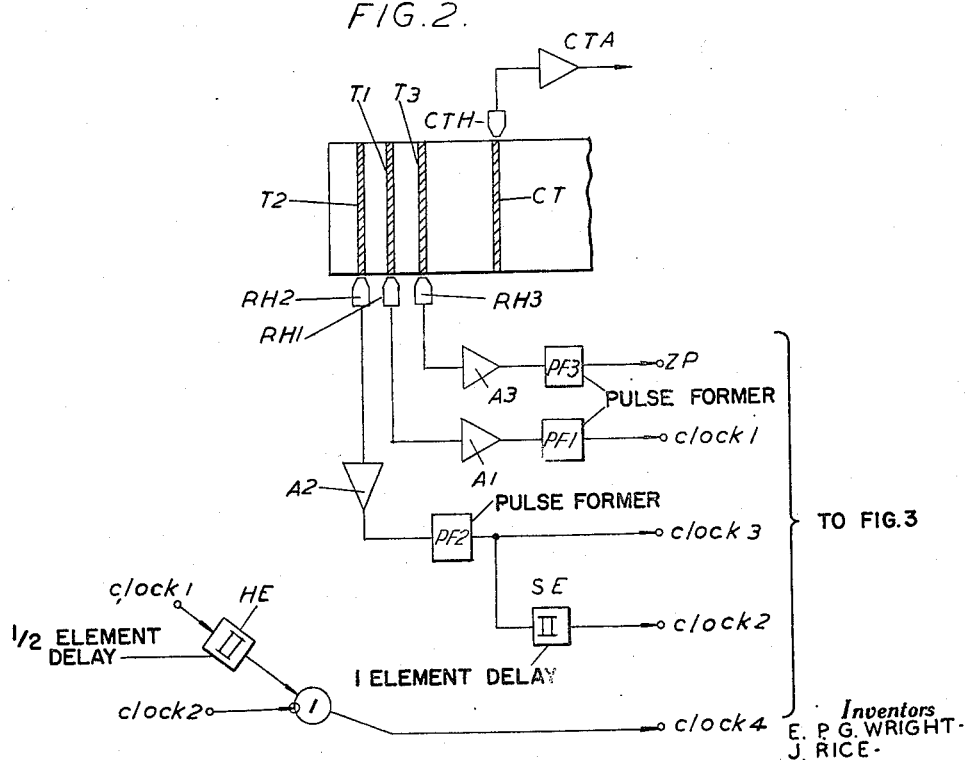

FIG.5.

| NO. OF STEPPING PULSES | ELEMENTS IN POSTIONS | | | | | CHARACTER | |
|---|---|---|---|---|---|---|---|
| | 1 | 2 | 3 | 4 | 5 | CASE 1 | CASE 2 |
| 32 | M | M | M | M | M | LETTERS | |
| 31 | S | M | M | M | M | V | = |
| 30 | M | S | M | M | M | X | / |
| 29 | M | M | S | M | M | FIGURES | |
| 28 | S | M | M | S | M | P | 0 |
| 27 | S | S | M | M | S | N | , |
| 26 | M | S | S | M | M | B | ? |
| 25 | M | M | S | S | M | W | 2 |
| 24 | S | M | M | S | S | I | 2 |
| 23 | M | S | M | M | S | F | OPTIONAL |
| 22 | S | M | S | M | M | G | OPTIONAL |
| 21 | S | S | M | S | M | H | OPTIONAL |
| 20 | M | S | S | M | S | D | WHO ARE YOU |
| 19 | S | M | S | S | M | L | ) |
| 18 | M | S | M | S | S | S | ' |
| 17 | S | M | S | M | S | R | 4 |
| 16 | M | S | M | S | M | Y | 6 |
| 15 | M | M | S | M | S | J | BELL |
| 14 | M | M | M | S | M | Q | / |
| 13 | S | M | M | M | S | C | : |
| 12 | S | S | M | M | M | M | . |
| 11 | S | S | S | M | M | O | 9 |
| 10 | S | S | S | S | M | T | 5 |
| 9 | S | S | S | S | S | NOT NORMALLY USED | |
| 8 | M | S | S | S | S | E | 3 |
| 7 | S | M | S | S | S | LINE FEED | |
| 6 | S | S | M | S | S | SPACE | |
| 5 | S | S | S | M | S | CARRIAGE RETURN | |
| 4 | M | S | S | S | M | Z | + |
| 3 | M | M | S | S | S | A | - |
| 2 | M | M | M | S | S | U | 7 |
| 1 | M | M | M | M | S | K | ( |
| 0 | M | M | M | M | M | LETTERS | |

Inventors
E. P. G. WRIGHT·
J. RICE·
N. F. FOSSEY
By *[signature]*
Attorney

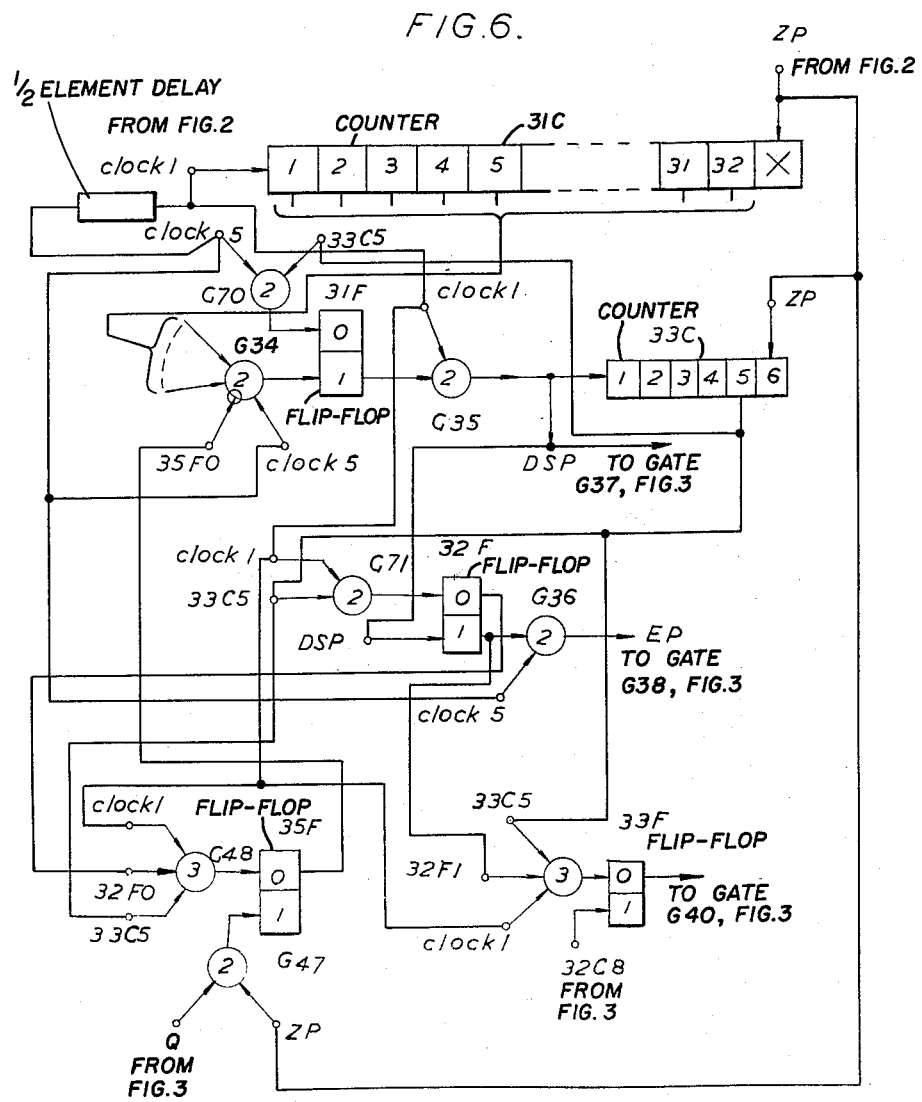

United States Patent Office 2,958,726
Patented Nov. 1, 1960

2,958,726
TELEGRAPHY ENCODING EQUIPMENT COMPRISING MAGNETIC STORAGE MEANS

Esmond Philip Goodwin Wright, Joseph Rice, and Nigel Frederick Fossey, London, England, assignors to International Standard Electric Corporation, New York, N.Y.

Filed Oct. 14, 1954, Ser. No. 462,331
Claims priority, application Great Britain Nov. 4, 1953
6 Claims. (Cl. 178—17)

The present invention relates to equipment for the translation of signals into a multi-element two-condition code.

According to the present invention there is provided equipment for transmitting signals in a multi-element two condition code, which comprises a number of storage devices in each of which is recorded the combination in said code which represents one of said signals, and means responsive to reception of a signal to be transmitted to extract from the appropriate storage device the code combination corresponding to said signal.

According to the present invention there is provided equipment for translating signals into a multi-element two-condition code, which comprises a number of storage devices in each of which is recorded the combination in said code which represents one of said signals, and means responsive to the reception of a signal to be translated to extract from the appropriate storage device the code combination corresponding to said signal.

According to the present invention there is provided equipment for translating signals into a multi-element two-condition code, which comprises an endless track of magnetic material, reading means associated with said track, said track being movable with respect to said reading means and providing a number of storage devices in each of which a combination in said two condition code is permanently recorded, a distributor having a position individual to each of said storage devices and so controlled that said distributor reaches the position individual to a store when that store is in operative relation with said reading means, and means responsive to the coincidence of the receipt of a signal to be translated, and of said distributor reaching the position individual to the storage device containing the code combination corresponding to said received signal to cause said reading means to read the required code combination off said track.

The term memory, as used in certain of the claims and in the specification, means a device in which intelligence can be recorded by creating internal strain in the material of the memory and in which stored intelligence can be detected by detecting the state of the strain in the material.

Examples of internal strain which are used to store intelligence are magnetisation of either one of two polarities, as in the magnetic drum, tape or wire, or in the static magnetic matrix; electrification of either one of two polarities, as in the ferro-electric storage matrix; electric charges of either one of two polarities, as in the cathode ray tube storage device; and compression waves in acoustic delay lines, such as mercury delay lines and magneto-strictive delay lines.

The term memory, as used in the present specification and in the claims appended thereto, should therefore be interpreted to include any device fully within the terms of this definition, and in any case includes all the examples listed in the preceding paragraph. It further includes a pattern movement register, also known as a shifting register.

The invention will now be described with reference to translating equipment in which a magnetic drum track is used as the memory, as shown in the accompanying drawings, in which:

Fig. 1 is a schematic diagram showing a track on the surface of a magnetic drum, with associated waveforms.

Fig. 2 shows schematically how the pulse trains whose waveforms appear in Fig. 1 are produced.

Figure 4:
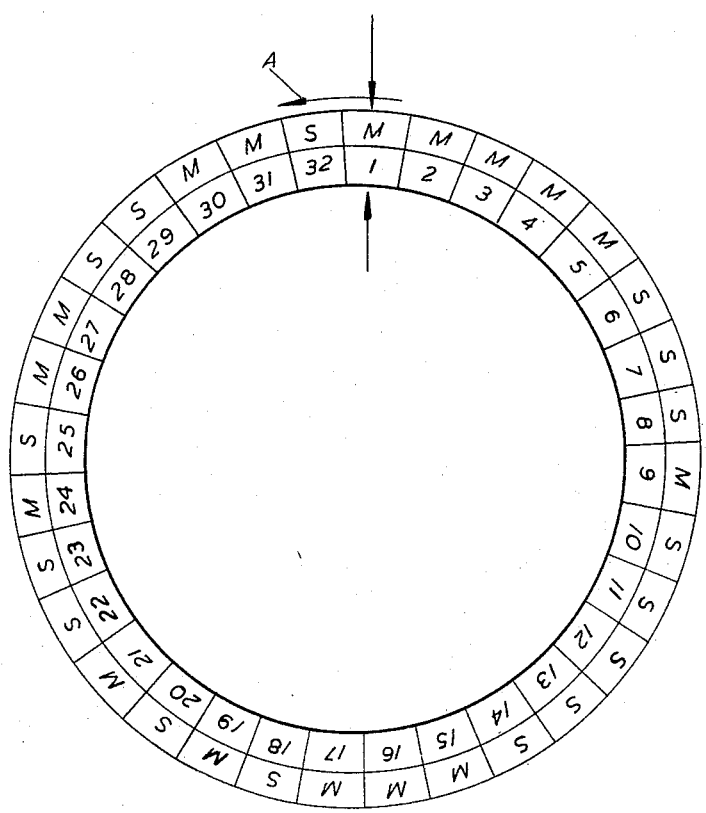

Figs. 4 to 6 together show an arrangement for the code combination storage which can advantageously be used in the system described.

Figure 3:
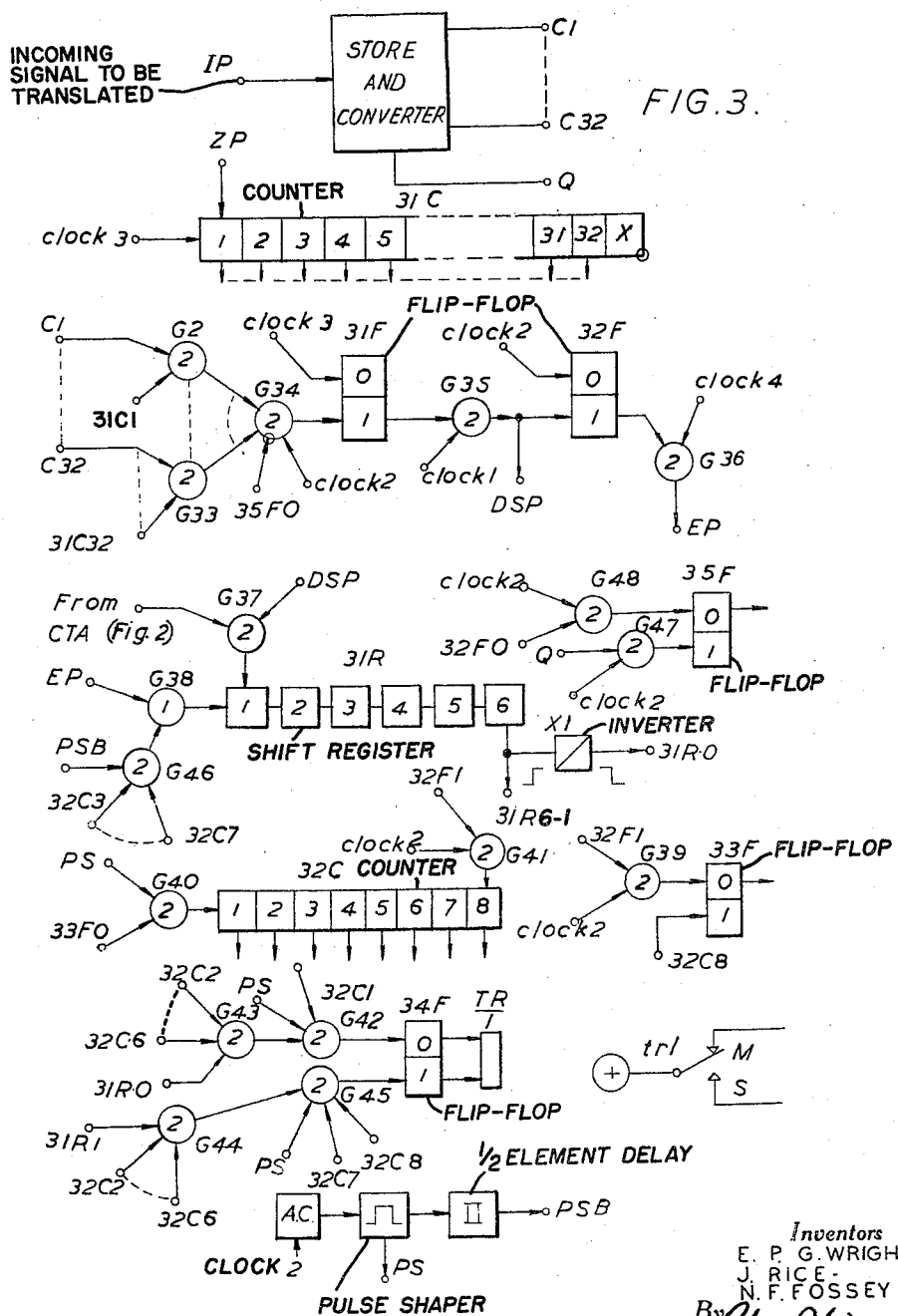
Fig. 3 shows the translating circuit according to the present invention.
Figure 7:
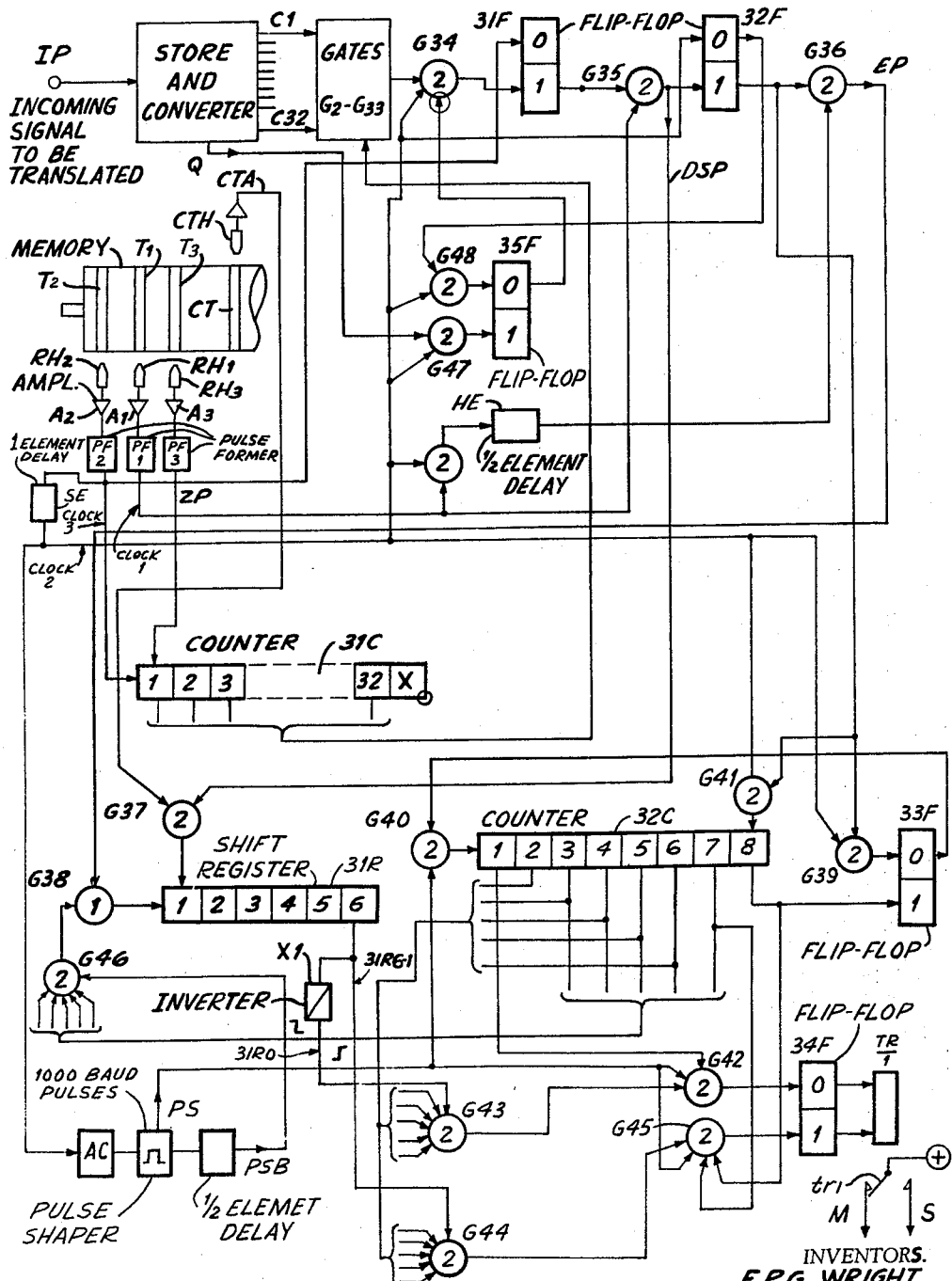

Fig. 7 is a complete schematic diagram of the entire circuit arrangement of Figs. 2 and 3.

*The magnetic drum*

Reference has been made above to the fact that in certain embodiments of the invention combinations in the code into which translation is to be made are stored in storage devices. In one of the systems which have been described, a number of such storage devices are provided by the use of a track on a magnetic drum. Clearly other comparable types of equipment could be used to provide the storage devices. For example, pattern movement registers, cathode ray tubes, acoustic delay lines, ferro-electric storage matrices, or ferro-magnetic storage matrices could be used.

The magnetic drum which has been used consists of a hollow brass drum having a magnetic skin on its cylindrical surface, which skin provides a number of closely-spaced peripheral tracks with each of which there is associated at least a reading head. Normally each track is provided also with a recording head usually in the form of a compound head. However, in the system which is herein described there is never any necessity to record on the drum during operation. All that is done is to read off the drum intelligence which has previously been recorded therein. It should not be overlooked, however, that in certain applications of this invention, for instance, where translation is effected from one two-condition code to another two-condition code, it might be desirable to record intelligence on the drum preparatory to or during the translation process. The drum is arranged to be rotated at a high speed, for example by an electric motor.

The intelligence recorded on the drum which is read as required is in the form of successive unspaced longitudinal magnetisations of either one of two polarities which are used to represent "0" or "space" and "1" or "mark" respectively. As has already been indicated, the track used is divided into a number of separate lengths of track, each such length constituting one storage device. How this is effected will be described later, there being no physical indication of this division on the actual track.

In addition to the track just mentioned, which is used to store the code combinations, there are three clock pulse tracks which are used to produce the pulse trains shown in Fig. 1. How this is effected will be described later in connection with Fig. 2.

*Circuit conventions*

The circuit diagrams shown use simplified symbols, and some explanation of these symbols is desirable.

Electronic gates are shown as circles with incoming controls shown as radial leads with arrow-heads touching the circle. Outputs are shown as radial leads with arrow-heads pointing radially outwards. The number inside the circle indicates the number of incoming controls which must be energised for the gate to deliver an output; for example, if there are six inputs and the number in the circle is two the gate will deliver an output when any two of its controls are energised.

When a small circle is shown on a control lead where it meets the circle of the gate, it means that when that control is energised, the gate can *never* deliver an output. The energisation of such a control is said to inhibit the operation of the gate of which it forms part.

Gates are given references commencing with the letter G.

A counter (or distributor) comprising a number of single component stages each of which can assume one of two conditions, "on" or "off," is shown as a series of rectangles drawn in linear array, e.g. 32C, Fig. 3. Such a counter only has one stage in the "on" condition at once, and when the next stage comes on, the stage which was previously on is switched off. The stages are operated in an invariable sequence.

A bi-stable circuit is shown as two contiguous rectangles, representing its two components. Only one component can be maintained in its "on" state at once; if the other component comes on, the previously on one is switched off.

A pattern movement register, or shifting register, is shown as a linear array of non-contiguous rectangles having a line connecting them along their mid-points.

An inverter is shown as a diagonally bisected rectangle.

To further simplify the circuit diagrams, the majority of the leads interconnecting different parts of the circuit have been omitted. The short control leads to the gates have therefore been assigned references to indicate where they come from.

Any conventional signs not already described which need description will be described when they are encountered.

*General operational description*

The system described is intended for translating signals received in one code form into start-stop printing telegraph signals. The received signals can, of course, be signals in any other code, such as the Morse code or the well-known constant total code, and similarly the translation could be from, say, start-stop code into constant total code.

Each received signal is received and converted to an electrical potential on one of thirty-two leads, this number being selected because there are thirty-two combinations in the start-stop code used in the telegraph art. This can be effected in any suitable manner. In fact the marking of one lead out of thirty-two could be effected direct from the keyboard of a teleprinter.

On the magnetic drum which forms the central item of the equipment described, one track is used for recordings of all code combinations used. Hence in this case there are thirty-two separate recordings on the track, each occupying a portion of the track forming one separate storage device. Each storage device contains the five permutable code elements for one of the characters for which translation is required. The start and stop elements are not recorded on the track since they are always the same. They are produced by circuitry associated with the drum. If it was for any reason preferable so to do, they could, of course, be recorded. Between consecutive combinations recorded on the track, there is a gap of one element width, i.e. the storage devices are separated by one element space. This track is called the code track. As an alternative, a short code track could be used arranged in the manner which will be described when the second arrangement comes to be described.

Associated with the drum there is a distributor, having a number of output connections equal in number to the number of combinations of the code into which translation is to be effected. This distributor is so controlled in synchronism with the code track that while a code combination is passing under the read head, the distributor has its output connection individual to that code combination energised. This distributor steps while the end of each storage section is under the head.

Interconnecting this distributor and the set of leads representing code combinations there is a gating network which delivers an output when the distributor output which corresponds to the character to be translated is energised. The result of this is to allow the read head to read the next code combination to appear at the read head, this being stored in a pattern movement register which functions as a temporary storage circuit.

When the code combination has been fully received in the pattern movement register, the code combination is transmitted under control of the pattern movement register and of a time scale, and it is during this transmission that the start and stop elements are inserted.

In one example of use of the system, the translation is fully automatic and transmission occurs either to a telegraph channel or to a magnetic tape recording unit. Where the translating apparatus is directly controlled from a teleprinter keyboard, the transmission is preferably to a magnetic tape recording unit in which the tape is advanced only when a recording is made thereon. The translated message can then be sent over a teleprinter channel from the tape at any desired speed within the capabilities of the tape reading apparatus.

*Waveform production (Fig. 2)*

It has already been stated that the controlling pulse trains are derived from recordings on three clock pulse tracks. How this is effected will now be described with reference to Fig. 2.

One track T1 has a "mark" recording aligned with each element position for all tracks on the drum. Although in the system described herein only one such track is actually in use, other tracks on the drum could obviously be in use for other purposes. This track has a read head RH1, which feeds on amplifier A1, which in turn feeds a pulse former PF1. The output from PF1 forms the clock 1 pulse train.

A second track T2 has a "mark" recording aligned with the last element position of each section or storage device of the code track CT, that being the track on which the combinations are recorded. This track via head RH2, amplifier A2 and pulse former PF2 produces the clock 3 pulse train. Note that each clock 3 pulse occurs at the mid-point of an element position. Clock 2 pulses each occur one element time after a clock 3 pulse, so the output from PF2 is fed via a one-element delay circuit SE to produce clock 2 pulses. Clock 4 pulses each occur half an element after a clock 1 pulse, but with one omitted for each clock 2 pulse. Hence to produce clock 4, the clock 1 train is applied to a gate G1, which is inhibited on each clock 2 pulse, via a half element delay circuit HE.

To synchronise the distributor at a particular point in the drum cycle, a third track T3 is used, this track having a single "mark" recording which is aligned with the blank element position ahead of the first storage device on the code track. This, via RH3, A3, and PF3 gives output ZP. ZP occurs at the mid-point of its element position. An alternative synchronisation method would be to place an extra recording on the track T2 or T1, this being "recognised" by associated circuits, and being used to generate ZP.

*Detailed descritpion (Figs. 3 and 7)*

An incoming signal to be translated is shown as being received over lead 1P, and converted in a store and converter 1 into an electrical energisation of one of 32 leads C1 to C32. As has already been explained, these leads could clearly be energised direct from the keyboard of a teleprinter or a typewriter.

The brief general description has already mentioned a distributor. This is formed by a counter 31C having 33 positions, 1 to 32 and a rest position X. This is synchronised in position No. 1 by ZP and stepped by clock 3. Hence while one element of counter 31C is in its operated condition, the corresponding storage section of the code track CT is passing under the code track reading head CTH. Associated with this distributor there is a gating assembly formed by 32 gates G2 to G33, two of which are shown. Each of these gates has two controls, one from one of the converter leads C1 to C32 and one from the output of 31C which corresponds to the storage device containing the code combination for that lead of C1 to C32. The outputs of all of these gates are extended to gate G34, which at the time of clock 2 after the coincidence of one of the C1–32 and the corresponding one of the 31C 1–32, both being energised, passes a pulse to 31F·1, which operates and renders non-operated 31F·0, which is normally operated.

With 31F1 oeprated, G35 passes clock 1 pulses, the first one of which operates 32F from 32F0 operated to 32F1 operated. The pulses passed by G35 also form the drum stepping pulses DSP. When the next clock 3 pulse occurs, 31F is restored to 31F0 operated, which closes the gate G35. Inspection of Fig. 1 reveals that this permits five DSP pulses to be produced.

Returning to 32F, which was operated to 32F1 by the first DSP pulse, 32F1 operated opens gate G36, which therefore passes clock 4 pulses to form the examining pulses EP. On the next clock 2 pulse, 32F restores to 32F0 operated, which closes G36, cutting off the supply of clock 4 pulses. Hence five EP pulses are produced.

Thus 31F and 32F respond to a coincidence signal to produce two pulse trains, each of five pulses, of which each of the EP pulses occurs half an element period after the corresponding DSP pulse. Although these pulses are short pulses, they can be "stretched" i.e. their length increased if this is needed.

The code track head CTH, shown in Fig. 2, continuously reads what is recorded on the code track CT. Its output is applied by an amplifier CTA (Fig. 2) to gate G37 (Fig. 3), over the other input to which are applied the drum stepping pulses DSP. Hence as a result of the generation of DSP, one code combination is read from the track, G37 giving an output for each mark element. This output forms the input for the pattern movement register or shifting register 31R. Since the recording read from CT may occur slightly after clock 1 occurs, it may be desirable, as mentioned above, to lengthen the DSP pulses before applying them to G37. This can be done in any one of many ways which are well-known.

The stepping of the pattern in this register is effected by the examining pulses, EP, which are applied to the register via gate G38. As these each occur just after the DSP pulses, the result is that the code combination is finally stored in 31R1 to 6, the first permutable element being in 31R6.

When 32F was operated to 32F1, it also energised one control of gate G39, which thus delivers an output on the next clock 2 to operate 33F from 33F1 to 33F0. The fact that 33F is energised at 33F0 records the fact that the combination required is now in 31R2 to 31R6.

In the present system it has been assumed that each received character is sent after reception to a telegraph line or to a recording device of the type briefly described above at 1000 bauds. Hence a pulse source PS, from which are obtained 1000 baud pulses, is provided.

As soon as 33F operates to 33F0, gate G40 commences to pass 1000 baud pulses to 32C, which is normally standing with 32C8 energised. This is ensured by gate G41, which delivers an output to 32C8 at 32F1 plus clock 2, i.e. at the same time as G39 sets 33F to 33F0. The first PS pulse therefore sets 32C to 32C1. The result of this is that gate G42 has a control energised and so passes a PS pulse to operate 34F from 34F1 to 34F0, which operates the high speed telegraph relay from mark to space. Thus the start element has been produced as a space. 34F and TR remain at their space conditions until further input is received by 34F.

At the same time as G42 passes a pulse to 34F0, G40 passes a PS pulse to 32C to step it to 32C2. We will now consider the output arrangements of 31R. They comprise one lead 31R6·1 taken direct from 31R6 which is energised if 31R6 is operated for a mark element, and an inverter X1 whose output lead 31R·0 is energised if 31R6 is non-operated for a space element.

At 32C2, one control input to each of gates G43 and G44 are energised. If the first permutable element is a space, 31R·0 will be energised and G43 will deliver an output which, via G42 is applied to 34F0. As 34F0 is already operated, this merely leaves the line in the space condition. If the first permutable element is a mark, 31R6·1 will be energised, and G44 delivers an output. Then G45 will pass a PS pulse to 34F1 to restore 34F to 34F1 and relay TR to "mark." The time scale steps in response to PS at the same time as TR is controlled, so that 32C3 is now energised. This results in gate G46 passing a PSB pulse via G38 to 31R to step the pattern, thus placing the next permutable element in 31R6. PSB pulses each occur midway between two PS pulses, so that 31R now holds the next permutable element, ready to be dealt with on the next PS pulse.

On the next and subsequent PS pulses, with PSB pulses, the subsequent permutable elements are dealt with, each PSB pulse driving "out" one of the elements in 31R. On 32C reading 32C7, 31R is "emptied" on the PSB pulse. On the PS pulse thereafter, G45 has its controls 32C7 and PS energised, and so delivers an output to 34F1. The same occurs at 32C8. Hence two stop elements, both being mark, are produced. Two stop elements for a transmitted code combination, giving an eight unit code, is much used in the telegraph art.

On 32C8, 33F is reset to 33F1, so stopping the supply of PS pulses to 32C. The equipment has now returned to rest.

It will be seen that 31C has a rest position 31CX. This is because the code track is longer than is needed to accommodate the code sections. Hence when all have passed head CTH, 31C steps to 31CX and stays there until ZP occurs, when it starts to cycle again.

To ensure that each signal to be translated can only cause one translation, a "safety" bistable circuit 35F is provided, which normally has its unit 35F0 operated. On reception of a signal to be translated, lead Q from the store and converter is energised at the same time as one of C1–32 are energised. When this occurs, G47 passes the next clock 2 pulse to set 35F to 35F1. This means that the inhibiting-control from 35F0 to G34 is disabled, so that the scanner formed by gates G2–G33 is enabled. The next clock 2 pulse which can have any effect on 35F occurs after the five DSP pulses and EP pulses have been produced, and is passed by G48 since 32F has now restored to 32F0. Hence only one translation can occur.

*Simplified code storage (Figs. 4 to 6)*

In this, the storage occupies only 32 elements, these being set as shown in the outer ring of Fig. 4. The table of Fig. 5 sets out the codes. With the outer ring set as shown, applied pulses are assumed to rotate the outer ring in the direction of arrow A. If combination No. 3 is to be selected, the outer ring is rotated three steps and the contents of the next five element positions read out. This would be MMSSS, this being the combination for the letter A.

As applied to the system already described, this would involve 32 element positions on the code track CT. In this case coincidence between one of C1 to C32 and one of 31C1 to 31C32 would lead to the next five element positions being read off the drum into 31R.

Although the economy of storage space so obtained would be of little significance when using a magnetic drum, it may be very valuable when using a pattern movement register or a matrix store.

Fig. 6 shows certain parts of the circuit of Fig. 3 as modified for use with stores containing codes, as shown in Fig. 4, and it is assumed that it is a length of drum track. The pulses used are clock 1, which is the same as in Fig. 1, clock 5, which is clock 1 delayed by half an element time, and ZP which in this case occurs at the mid point of an element position preceding the start of the code store. This code store has the first four elements duplicated, although in the case of a 32 element closed ring circulating store this would not, of course, be needed. Each storage device which holds a code combination is now a set of five element positions commencing from one of the first 32 element positions on the code track.

The references in Fig. 6 are, where possible, the same as in Fig. 3. The counter 31C, which forms the distributor is now synchronised to 31CX by ZP and driven by clock 1. When clock 1 drives 31C to the position for the wanted code, G34 opens to the immediately-following clock 5 to operate 31F to 31F1. This opens gate G35 to clock 1 to produce DSP. These are applied to a counter 33C, and when five have been produced, the coincidence of 33C5 and clock 5 opens G70 to restore 31F to 31F0, cutting off DSP.

DSP are also applied to 32F to set it to 32F1, which opens G36 to clock 5 to produce EP. These and DSP are used in the manner already described. 32F is changed 32F0 by the coincidence of 33C5 and the next clock 1 via G71, thus cutting EP off.

35F is set to 35F1 by Q and ZP at the beginning of the cycle, and reset to 35F0 by clock 1, 33C5 and 32F0. 33F0 is controlled by clock 1, 32F1 and 33C5.

While the principles of the invention have been described above in connection with specific embodiments, and particular modifications thereof, it is to be clearly understood that this description is made only by way of example and not as a limitation on the scope of the invention.

What we claim is:

1. Equipment for translating signals into a multi-element two-condition code comprising a memory which has a plurality of sequential storage element positions effectively equal in number at least to $n+o-1$, where $n$ is the number of posible code combinations in said code and $o$ is the number of permutable code elements per combination, said element positions containing permanent recordings of either condition of said two condition code, which recordings are so arranged that each element from the first element position to the $n$th element position is the first element of one of said combinations, the subsequent $o-1$ element positions containing the remaining elements of that combination, each sequence of $o$ element positions therefore containing one of said code combinations and each said sequence commencing from and including one of the first $n$ element positions of said memory, reading means for sequentially reading the permanent recordings of said storage element positions of said memory upon relative movement of said memory and reading means in a predetermined direction, means for causing said relative movement, and means for initiating the operation of said reading means as it passes a selected one of said first $n$ storage element positions and for continuing said operation until said reading means has passed $o$ storage element positions including said selected position.

2. Equipment, as claimed in claim 1, in which the memory comprises a length of magnetic track, the last $o-1$ element positions being identical to the first $o-1$ element positions.

3. Equipment, as claimed in claim 2, in which the magnetic track is a closed ring having $n$ element positions.

4. Equipment for translating signals into a multi-element two-condition code comprising a plurality of storage elements positioned sequentially so as effectively to form a plurality of storage devices in each of which is permanently recorded the combination of said code which represents a different one of said signals, said code combinations being in printing telegraph code without their start and stop elements, a temporary storage device, means responsive to a signal to be transmitted for selecting the storage device containing the code combination corresponding to said signal, for reading the code combination stored therein, and for storing it in said temporary storage device, and means responsive to the storage of the last element of said code combination in said temporary storage device for transmitting the code combination stored in said temporary storage device, said transmitting means comprising a counting circuit having an output for each element of a code combination including said start and stop elements, means responsive to the insertion of a code combination in said temporary storage circuit to step said counting circuit throughout its cycle, means under control of said counting circuit for generating a start element, means under control of said counting circuit and said temporary storage circuit for generating the permutable elements of said code combinations, and means under control of said counting circuit for generating the stop element.

5. Equipment, as claimed in claim 4, in which the temporary storage device is a pattern shift register, the connecting circuit having means for causing the shifting of the code combination in said pattern shift register, and the means for generating the permutable elements of the code combinations comprises means responsive to the condition of the last stage of the pattern shift register each time the pattern in said register shifts.

6. Equipment for translating signals into multi-element, two-condition code comprising a memory having a plurality of sequential storage elements, each element having one condition or another condition permanently stored therein, each element, together with a predetermined number of sequentially following elements, representing a recorded multi-element, two-condition code, the stored conditions of said elements being such that the code represented by each element and its associated predetermined number of sequentially following elements is different from every other element and its associated following elements, means for selecting any one of said elements, means responsive to said selecting means for reading the selected element and its associated following elements, and means responsive to said reading means for transmitting the signals representing the conditions read from said elements.

References Cited in the file of this patent

UNITED STATES PATENTS

| | | |
|---|---|---|
| 2,404,339 | Zenner | July 16, 1946 |
| 2,540,654 | Cohen et al. | Feb. 6, 1951 |
| 2,549,071 | Dusek | Apr. 17, 1951 |
| 2,614,169 | Cohen et al. | Oct. 14, 1952 |
| 2,679,035 | Daniels et al. | May 18, 1954 |
| 2,721,990 | McNaney | Oct. 25, 1955 |